United States Patent [19]

Morishita et al.

[11] Patent Number: 4,608,639

[45] Date of Patent: Aug. 26, 1986

[54] CHARGE CONTROL MICROCOMPUTER DEVICE FOR VEHICLE

[75] Inventors: Mitsuharu Morishita; Shinichi Kouge, both of Hyogo, Japan

[73] Assignee: Mitsubishi Denki Kabushiki Kaisha, Tokyo, Japan

[21] Appl. No.: 495,542

[22] Filed: May 17, 1983

[30] Foreign Application Priority Data

May 18, 1982 [JP] Japan .................................. 57-85208

[51] Int. Cl.⁴ .......................... H02J 7/14; G06F 15/56
[52] U.S. Cl. ..................................... 364/424; 364/483; 324/433; 320/32; 320/64; 322/23; 322/25; 322/22
[58] Field of Search ............ 364/481, 483, 424, 431.04, 364/431.03; 320/32–34, 36–43, 48, 49, 61, 64, 72; 324/433

[56] References Cited

U.S. PATENT DOCUMENTS

| | | | |
|---|---|---|---|
| 4,191,918 | 3/1980 | Nicholls | 320/37 |
| 4,290,109 | 9/1985 | Taniguchi et al. | 364/481 |
| 4,308,492 | 12/1981 | Mori et al. | 320/35 |
| 4,333,149 | 6/1982 | Taylor et al. | 364/481 |
| 4,377,787 | 3/1983 | Kikuoka et al. | 324/427 |
| 4,390,841 | 6/1983 | Martin et al. | 324/427 |
| 4,418,310 | 11/1983 | Bollinger | 320/37 |
| 4,423,378 | 12/1983 | Marino et al. | 324/427 |

*Primary Examiner*—Felix D. Gruber
*Assistant Examiner*—Thomas G. Black
*Attorney, Agent, or Firm*—Sughrue, Mion, Zinn, Macpeak & Seas

[57] ABSTRACT

A charge control microcomputer is provided for a vehicle charging system to control the reference voltage employed by the voltage regulator so that a suitable battery charging voltage is generated at all times. The microcomputer processes charging system data such as the battery output voltage, the generator output current, etc., and at least one engine parameter from an engine control microcomputer to derive the most suitable reference voltage for the voltage regulator.

3 Claims, 1 Drawing Figure

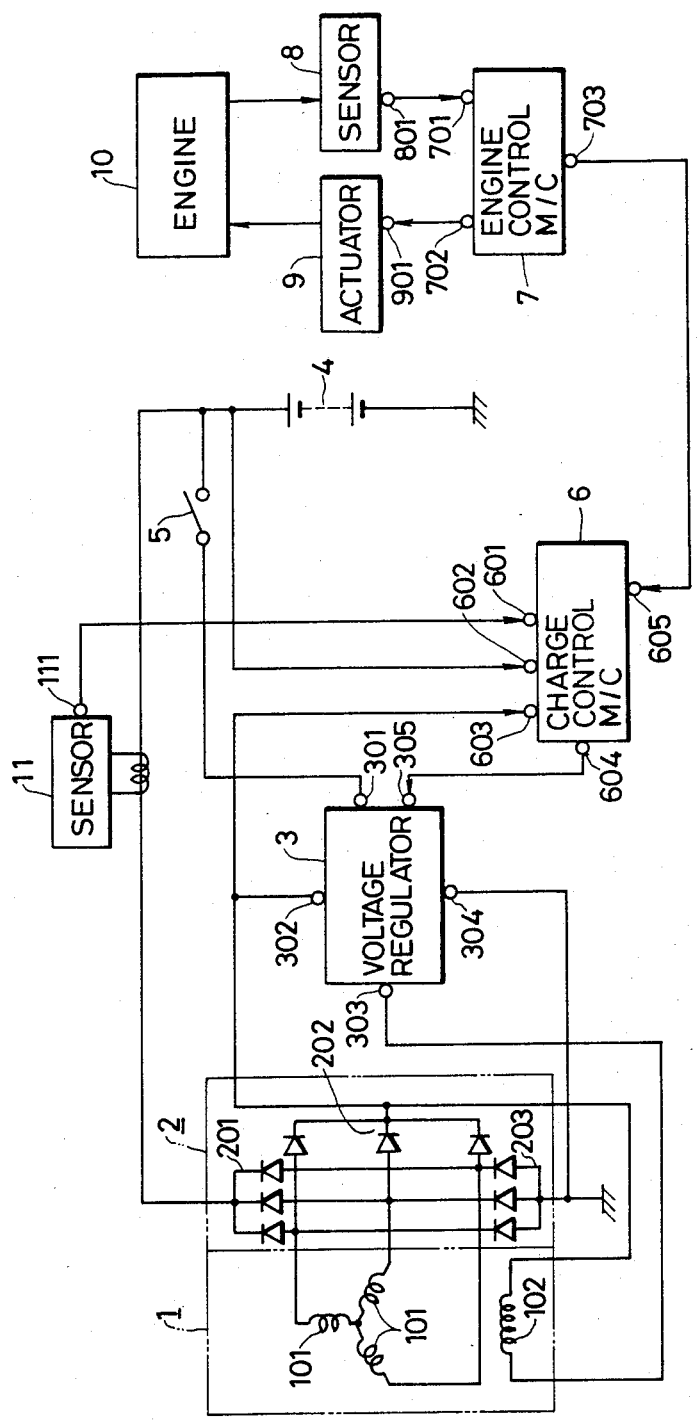

CHARGE CONTROL MICROCOMPUTER DEVICE FOR VEHICLE

BACKGROUND OF THE INVENTION

This invention relates to a charge control microcomputer device for a vehicle, which externally provides a predetermined value for a voltage regulator which is adapted to control the output voltage of a charging generator installed on a vehicle or the like and driven by an internal combustion engine.

In general, in a conventional device of this type, the output voltage of the generator driven by the internal combustion engine or the like is controlled to a predetermined value by the voltage regulator installed together with the generator. In this connection, the voltage regulator may include a temperature compensating circuit as the case may be, so as to prevent the difficulty where the battery's charging characteristic changes with temperature. However, since the battery and the voltage regulator are different from each other in their installation locations and in their thermal capacity, in many cases the temperature increase correlation does not hold, therefore it is difficult to control the output voltage of the voltage regulator to equal the value most suitable for charging the battery.

The generator is driven by the internal combustion engine as described above. Therefore, the conventional device is disadvantageous, in that, when the aforementioned predetermined value is controlled during acceleration or deceleration of the engine, or according to the speed of rotation, to control the mechanical load of the engine, i.e., the generator drive output, it is difficult to externally control the output.

SUMMARY OF THE INVENTION

Accordingly, an object of this invention is to provide a charge control microcomputer device for a vehicle, in which the above-described difficulties are eliminated.

BRIEF DESCRIPTION OF THE DRAWING

The single FIGURE in the accompanying drawing is an electrical circuit diagram showing one example of a charge control microcomputer device for a vehicle according to this invention.

DETAILED DESCRIPTION OF THE PREFERRED EMBODIMENT

One example of the charge control microcomputer device according to the invention will now be described with reference to the single FIGURE in the accompanying drawing. In the FIGURE, reference numeral 10 designates an engine installed on a vehicle or the like; 1, a three-phase AC generator driven by the engine, the generator 1 having three-phase star-connected armature coils 101 and a field coil 102; 2, a full-wave rectifier for subjecting the AC output of the generator 1 to full-wave rectification; 201, 202 and 203, a first rectifier output terminal, a second rectifier output terminal and a ground terminal, respectively; 3, a voltage regulator for controlling the field current in the field coil 102, to control the output voltage of the generator 1; 301, an initial excitation terminal; 302, a voltage detection terminal; 303, a field coil terminal; 304, a ground terminal; and 305, an external control input terminal.

Further in the FIGURE, reference numeral 4 designates a battery which provides battery terminal voltage data; 5, a key switch; 6, a charge control microcomputer for processing data from an engine controlling microcomputer 7 (described later) and charge system data (including the battery terminal voltage data, generated voltage data, generator output current data, etc.) to externally set a control voltage for the voltage regulator 3; 601, an input terminal for receiving the output current of an output current sensor 11; 602, a battery voltage input terminal; 603, an input terminal for receiving the voltage at the second rectifier output terminal 202, i.e., the generated voltage data; 604, a reference signal output terminal through which an external control reference signal is applied to the external control input terminal 305 of the voltage regulator; and 605, an input terminal for receiving data from the engine control microcomputer 7.

Further in the FIGURE, reference numeral 7 designates the aforementioned engine controlling microcomputer 7; 701, an input terminal for receiving a signal from an engine state detection sensor 8; 702, an engine control signal output terminal; 703, a data output terminal for the charge control microcomputer 6; 8, the aforementioned sensor for detecting the engine state, to apply a detection signal to the engine controlling microcomputer 7; 801, a sensor signal output terminal; 9, an actuator receiving a control signal from the microcomputer 7, to mechanically drive the engine 10; 901, a control signal input terminal; 11, the aforementioned output current sensor for providing generator output current data; and 111, an output current output terminal. The parameter or parameters sensed by the sensor 8 may include intake air temperature, engine r.p.m., crank angle, exhaust gas temperature, the air fuel ratio, or the like.

The operation of the device of the invention, which is organized as described above, will now be described. When the engine 10 is started, first the key switch 5 is closed. As a result, a circuit consisting of the battery 4, the key switch 5, the initial excitation terminal 301 of the voltage regulator 3, the voltage detection terminal 302, the field coil 102, the field coil terminal 303 and the ground terminal 304 is completed, so that an initial excitation current flows in the field coil 102, and a field magnetomotive force is generated.

In this operation, the voltage of the battery 4 is applied through the key switch 5 to the microcomputers 6 and 7 and, when necessary, to the sensors 8 and 11, to operate these circuit elements.

The data on the engine 10 (engine parameter) is detected by the sensor 8, where it is converted into an electrical signal. The electrical signal is applied through the sensor signal output terminal 801 to the sensor input terminal 701 of the engine controlling microcomputer 7, where it is processed. As a result, the microcomputer 7 provides a control signal to make the engine 10 most suitable for starting. The control signal is applied through the engine control signal output terminal 702 and the control signal input terminal 901 to the actuator 9 to drive the latter, so that the engine is placed in the most suitable state for starting. The engine controlling microcomputer 7 applies the data from the sensor 8 through the data output terminal 703 to the data input terminal 605 of the charge control microcomputer 6. The charge control microcomputer 6 processes the engine data and the charge system data, to provide a predetermined voltage value for the voltage regulator which value is best in starting the engine 10. The predetermined value is applied to the reference signal output terminal 604.

When, under this condition, the engine 10 is started to drive the generator 1, an AC output is induced in the armature coils 101 according to the speed of the generator 1 and is subjected to full-wave rectification in the full-wave rectifier unit 2. As the voltage regulator 3 carries out the on-off control of the field current in the field coil 102, the output voltage of the rectifier 2 is controlled to the reference voltage provided by the charge control microcomputer 6. On the other hand, the charge control microcomputer 6 processes the engine data from the engine controlling microcomputer 7 and the charge system data during the operation of the engine 10, to calculate the reference voltage which is most suitable for the engine 10 and the charge system, and applies this value to the external control terminal 305 of the voltage regulator 3 through the reference signal output terminal 604 at all times.

As described in detail above, according to the invention, the charge control microcomputer internally processes data on at least one engine parameter from the engine controlling microcomputer, and charge system data including the battery terminal voltage data or the generated voltage data and the generator output current data, so that an optimum reference voltage is applied to the voltage regulator. Therefore, according to the invention, the reference voltage most suitable for charging the battery can be determined, and the reference voltage can be controlled during acceleration of the engine or according to the speed of the latter, so that the mechanical load, or the generator drive output, is readily controlled.

What is claimed is:

1. A charge control microcomputer device for a vehicle, comprising:
    an AC generator driven by an engine for generating an output current, said generator having armature coils and a field coil;
    a battery charged by a rectified output of said generator and generating a terminal voltage;
    a voltage regulator for controlling a current flowing in said field coil, to control an output voltage of said generator to a predetermined value;
    an engine controlling microcomputer for receiving engine parameter data from said engine, to control the operation of said engine;
    a charge control microcomputer for processing input data including data on at least one engine parameter output from said engine controlling microcomputer, and charge system data including at least one of battery terminal voltage data, generator voltage data and generator output current data, to provide a reference voltage for said voltage regulator.

2. A device as claimed in claim 1, wherein said engine control microcomputer controls a mechanical actuator to effect control of said engine, and outputs at least one engine parameter to said charge control microcomputer.

3. A device as claimed in claim 1, said voltage regulator including a reference voltage input terminal, said charge control microcomputer calculating a suitable reference voltage on the basis of said input data applied thereto and applying said value as a control signal to said reference voltage input terminal.

* * * * *